United States Patent [19]

Ohara et al.

[11] Patent Number: 5,750,633
[45] Date of Patent: May 12, 1998

[54] DOPE FOR CAST FORMATION AND METHOD OF MANUFACTURING THE SAME

[75] Inventors: Tomomi Ohara; Hisao Hachisuka, both of Osaka, Japan

[73] Assignee: Nitto Denko Corporation, Osaka, Japan

[21] Appl. No.: 547,439

[22] Filed: Oct. 24, 1995

[30] Foreign Application Priority Data

Oct. 26, 1994 [JP] Japan ................................. 6-262782

[51] Int. Cl.$^6$ ................................................. C08G 73/10
[52] U.S. Cl. .......................... 528/174; 528/170; 528/172; 528/173; 528/176; 528/185; 528/188; 528/220; 528/229; 528/353; 525/420; 525/422; 525/426; 525/432
[58] Field of Search ............................ 528/353, 188, 528/220, 229, 170, 172, 173, 174, 176, 185; 325/432, 422, 420, 426

[56] References Cited

U.S. PATENT DOCUMENTS

| | | | |
|---|---|---|---|
| 3,822,202 | 7/1974 | Hoehn | 210/23 |
| 3,959,350 | 5/1976 | Rogers | 260/47 |
| 4,705,540 | 11/1987 | Hayes | 55/16 |
| 4,717,393 | 1/1988 | Hyaes | 55/16 |
| 4,838,900 | 6/1989 | Hayes | 55/16 |
| 4,864,016 | 9/1989 | DuPont et al. | 528/353 |
| 4,929,405 | 5/1990 | Kohn | 264/41 |
| 4,932,982 | 6/1990 | Hayes | 55/16 |
| 4,933,132 | 6/1990 | Vora | 528/353 |
| 4,935,490 | 6/1990 | Hayes | 528/353 |
| 4,952,669 | 8/1990 | Vora | 528/353 |
| 4,954,609 | 9/1990 | Vora | 528/353 |
| 4,978,742 | 12/1990 | Vora et al. | 528/353 |
| 4,981,497 | 1/1991 | Hayes | 55/16 |
| 5,049,649 | 9/1991 | Kumar | 528/353 |
| 5,120,826 | 6/1992 | Vora et al. | 528/353 |
| 5,165,963 | 11/1992 | Matsumoto et al. | 427/245 |
| 5,178,940 | 1/1993 | Matsumoto et al. | 428/304.4 |

*Primary Examiner*—P. Hampton-Hightower
*Attorney, Agent, or Firm*—Merchant, Gould, Smith, Edell, Welter & Schmidt, P.A.

[57] ABSTRACT

A dope for cast formation comprising a fluorine including polyimide resin and an organic solvent (P) as main components. The fluorine including polyimide resin has at least one —$CF_3$ group in the repeating molecular unit. The organic solvent (P) is present during the resin polymerization of the fluorine including polyimide resin. The organic solvent (P) is diethylene glycol dimethyl ether.

27 Claims, No Drawings

DOPE FOR CAST FORMATION AND METHOD OF MANUFACTURING THE SAME

FIELD OF THE INVENTION

This invention relates to a dope for cast formation and method of manufacturing polyimide permeation membranes including fluorine by a wet phase transversion method. More specifically, this invention relates to a dope for cast formation and method of manufacturing polyimide permeation membranes including fluorine, which are used as asymmetrical or composite membranes to separate and condense hydrogen, methane, carbon dioxide, water vapor, ions, or the like.

BACKGROUND OF THE INVENTION

Polyimide is a permeation membrane material with excellent heat-resisting and anti-chemical properties due to its high glass transition point and rigid molecular chain structure. Therefore, permeation membranes of various polyimides have been examined. For example, U.S. Pat. No. 4,378,400 and U.S. Pat. No. 4,959,151 disclose aromatic polyimide using biphenyl tetracarboxylic dianhydride. Aromatic polyimide including fluorine is disclosed in Published Unexamined (Kokai) Japanese Patent Application No. Hei 5-7749, and U.S. Pat. Nos. 3,822,202, 3,899,309, 4,532,041, 4,645,824, 4,705,540, 4,717,393, 4,717,394, 4,838,900, 4,897,092, 4,932,982, 4,929,405, 4,981,497, and 5,042,992. Moreover, U.S. Pat. No. 4,964,887 and U.S. Pat. No. 4,988,371 disclose polyimides using aliphatic or alicyclic tetracarboxylic dianhydride.

However, most of the polyimides mentioned above cannot satisfy both permeability and separation requirements. U.S. Pat. No. 3,822,202 and U.S. Pat. No. 4,717,393 disclose that the aromatic polyimide permeation membrane including fluorine can satisfy both requirements, but the membrane is impractical and costly on an industrial scale.

In other words, the above-mentioned inventions cannot manufacture polyimide permeation membranes including fluorine at an industrial level. More specifically, pin holes are formed during manufacturing processes, thus reducing the separation properties and providing unevenness and instability. The manufacturing processes also become complex and costs increase if the negative effects caused by the pin holes are to be overcome. Furthermore, it is difficult to control manufacturing conditions when the pin holes are reduced by restricting the manufacturing conditions. As a result, films with stable separation properties and permeability cannot be manufactured.

SUMMARY OF THE INVENTION

It is an object of this invention to solve the above-mentioned conventional problems by providing a dope for cast formation used for manufacturing gas permeation membranes with high separation properties and gas permeating speed, reverse osmosis membranes and ultrafiltration membranes by simple and cost effective manufacturing processes. Pin holes, which radically reduce separation properties, are not formed in the polyimide gas or liquid permeation membranes which include fluorine in a significant amount, so that the gas or liquid permeation membranes formed from the cast dope (solution) are practical and are manufactured at low cost at an industrial level.

In order to accomplish these and other objects and advantages, the dope for cast formation of this invention includes polyimide resin and organic solvent (P) as main components. The polyimide resin includes at least three fluorine atoms in its repeating molecular unit, and the organic solvent is present while the polyimide resin including fluorine is polymerized.

It is preferable that the polyimide resin includes at least one —$CF_3$ group in the repeating molecular unit. It is further preferable that the polyimide resin includes from six to 12 fluorine atoms in the repeating molecular unit, thus providing stable composite gas permeation membranes of high quality. When the number of fluorine atoms in the repeating molecular unit exceeds 12, the material cost increases and practicality declines.

It is preferable that the fluorine including polyimide resin has a repeating unit which is expressed as the following Formula 1;

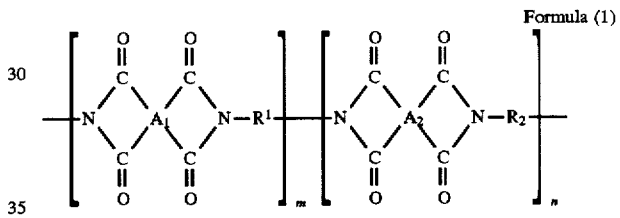

where $A_1$ and $A_2$ indicate tetravalent organic groups consisting of aromatic, alicyclic, or aliphatic hydrocarbon groups;

$R_1$ and $R_2$ are divalent aromatic, alicyclic, aliphatic hydrocarbon groups, or divalent organic groups in which the hydrocarbon groups are bonded by divalent organic bond groups; at least one organic group selected from the group consisting of $A_1$, $A_2$, $R_1$ and $R_2$ has at least three fluorine atoms; and $0 \leq m \leq 1$, $0 \leq n \leq 1$, and $m+n=1$.

It is preferable that the fluorine including polyimide resin comprises a repeating molecular unit as a main component expressed as the following Formula 2;

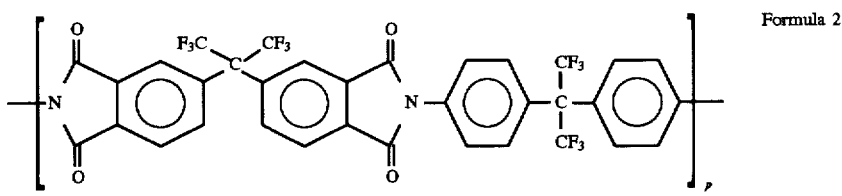

where p is an integer, preferably $50 \leq p \leq 500$.

It is preferable that the fluorine including polyimide resin is present in amount of 3–40% by weight in the cast solution.

It is preferable that the fluorine including polyimide resin is present in amount of 10–30% by weight in the cast solution.

It is preferable that the organic solvent (P) is diethylene glycol dimethyl ether.

It is preferable that the organic solvent (P) comprises an imide reacting agent.

It is preferable that the imide reacting agent comprises tertiary amine and acid anhydride.

It is preferable that the imide reacting agent comprises pyridine and acetic anhydride.

It is preferable that the fluorine including resin is prepared from substantially equimolar amounts of tetracarboxylic anhydride and diamine starting materials, and the imide reacting agent is present in a mol amount three times greater than that of the tetracarboxylic anhydride or diamine.

It is preferable that the fluorine including polyimide resin is produced by an imide reaction, with the imide reaction rate being 70% or more.

A method of manufacturing a cast product from a dope of this invention comprising the steps of: stirring and mixing substantially equimolar amounts of tetracarboxylic anhydride including at least three fluorine atoms and diamine in an organic solvent (P) to produce polyamic acid; subjecting the polyamic acid to an imide reaction at an imide reaction ratio of 70% or more to form a dope solution; and after the imide reaction applying the dope solution for cast formation.

It is preferable that the organic solvent is diethylene glycol dimethyl ether.

It is preferable that the organic solvent comprises at least one polar solvent selected from the group consisting of N-methyl-2-pyrolidone; pyridine; N,N-dimethyl acetamide; N,N-dimethyl formamide; dimethyl sulfoxide; tetramethyl urea; phenol; and cresol.

It is preferable that the fluorine including polyimide resin comprises at least one —$CF_3$ group in the repeating molecular unit.

It is preferable that the fluorine including polyimide resin comprises at least two different kinds of polyimide resin.

It is preferable that the fluorine including polyimide resin is mixed with at least one other polymer selected from the group consisting of polyimide other than the fluorine including polyimide resin, polysulfone and polyether sulfone, wherein the total amount of the other polymer is less than 50 mole %.

It is preferable that the other polymer is a copolymer or a mixed polymer.

It is preferable that the imide reaction comprises addition an imide reacting agent.

It is preferable that the imide reacting agent is at least one of material selected from the group consisting of tertiary amine, pyridine, acid anhydride, thionyl chloride, carbodiimide.

It is preferable that the imide reacting agent is pyridine and acetic anhydride.

It is preferable that the imide reaction is carried out at a temperature of from 5° C. to 150° C.

It is preferable that the imide reaction is carried out by heating the polyamic acid solution at a temperature of from 100° C. to 400° C., in the absence of an imide reacting agent.

It is preferable that further comprising adding an aprotic solvent to the dope solution in an amount of less than 40% by weight to adjust the solubility of the fluorine including imide resin and the final viscosity of the dope solution.

As long as $A_1$ or $A_2$ has its proton of the tetravalent organic group replaced by a fluorine atom or a group including a fluorine atom, there is no limitation on the organic group. However, it is further preferable that at least one proton of the tetravalent organic group is replaced by a —$CF_3$ group. For instance, it is preferable to use a tetravalent organic group shown in the following Formula (3).

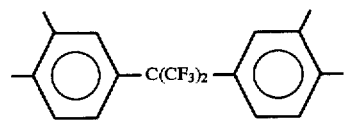

Formula (3)

There is no limitation on the divalent organic group including at least three fluorine atoms as long as $R_1$ or $R_2$ has its proton of the divalent organic group replaced by a fluorine atom or a group including fluorine atoms. It is more preferable to use $R_1$ or $R_2$ with at least one proton of the divalent organic group replaced by a —$CF_3$ group. Specifically, a divalent organic group expressed as in the following Formula (4)–(9) is preferably applied.

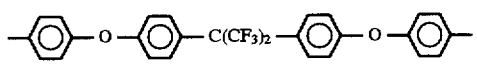

Formula (4)

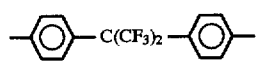

Formula (5)

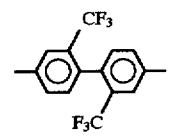

Formula (6)

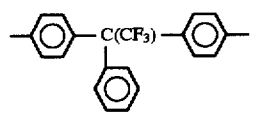

Formula (7)

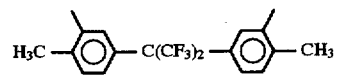

Formula (8)

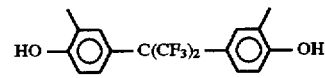

Formula (9)

Polyimide resin including fluorine applied in this invention preferably has a repeating molecular unit as a main component as shown in Formula (10).

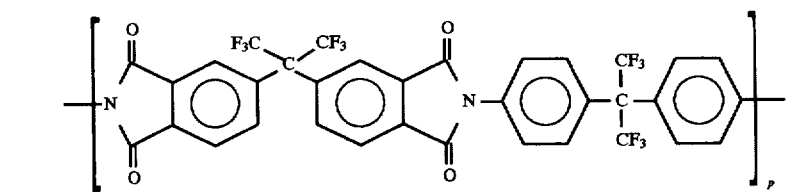

Formula (10)

where p is an integer, preferably $50 \leq p \leq 500$.

When the abundance ratio of amic acid to imide rings is less than 30% and the imide reaction ratio is 70% or more, no problems are encountered. If the imide reaction ratio is less than 70%, the separation properties of polyimide resin including fluorine decline and the affinity with a solidifying solution due to the increase of —COOH improves. As a result, pin holes are formed.

The polyimide resin including fluorine of the invention may be used alone, or can be mixed with at least two different kind of polyimide resin. Moreover, the polyimide resin including fluorine may be mixed with other polymers such as polysulfone and polyethersulfone as long as the mole % of the other polymer is less than 50%, thus providing a copolymer or a mixed material. The other polymers may use polyethylene glycol, poly (vinyl alcohol), poly amide, polyacrylate, poly (methyl methacrylate), cellulose acetate, polyimide resin etc. There is no limitation on the diamine of polyimide resin at least one diamine selected from the group consisting of 1,4-phenylenediamine, 5-chloro-m-phenylenediamine, 3,5-diamino benzoic acid, 1,3-phenylenediamine, 2,4-diamino toluene, 2,5-diamino toluene, 2,6-diamino toluene, 1,3-diamino-4-nitrobenzene, m-phenylenediamine-4-sulfonic acid, 2,5-dimethyl-p-phenylenediamine, 2,4,6-trimethyl-1,3-phenylenediamine, 2,3,5,6-tetramethyl-1,4-phenylenediamine, 1,5-naphthalenediamine, bis(4-(4-aminophenoxy)phenyl) sulfon), bis(3-aminophenyl sulfon), α,α'-bis(4-aminophenyl)-1,4-diisopropylbenzene, 4,4'-diamino diphenylether, 3,4-diamino diphenylether, 2,2-bis(4-(4-aminophenoxy)phenyl)hexafluoropropane, 2,2-bis(4-(4-aminophenoxy)phenyl)propane, 3,3'-dihydroxy-4,4'-diaminobiphenyl, 2,2'-dimethyl-4,4'-diaminobiphenyl, 3,3'-dimethyl-4,4'-diaminobiphenyl, 2,2-bis(3-amino-4-methylphenyl)hexafluoropropane, 3,3'-diaminobenzophenone, 9,9'-bis(4-aminophenyl)fluorene, 4,4'-bis(4-aminophenoxy)biphenyl, 1,4-bis(4-aminophenoxy)benzene, 4,4'-diaminobenzanilide, 2,2'-bis(3-amino-4-hydroxyphenyl)hexafluoropropane, 2,5-diethoxy-p-phenyldiamine, 4,4'-diaminodiphenylsulfone, 4,4'-diaminodiphenylsulfide, 4,4'-methylene-bis(2-chloroaniline), bis(4-(3-aminophenoxy)phenyl sulfone, 1,3-bis(4-aminophenoxy)benzene, 2,2',5,5'-tetrachloro-4,4'-diaminobiphenyl, 3,7'-diamino-2,8-dimethyldibenzthiophenesulfone, 1,4-bis(4-aminophenoxy)-2-phenylbenzene, neopentyl glycol-di-4-aminophenylether, 2,4-diaminophenol, 2,4-diamino anosole, 2,4-diaminodiphenylether, m-xylenediamine, 1,3-bis(m-aminophenoxy)benzene, 3,3'-dichloro-4,4'-diaminobiphenyl, 3,3'-dimethoxy-4,4'-diaminobiphenyl, 4-chloro-m-phenylenediamine, 3,3'-dimethyl-4,4'-diaminobiphenyl-6,6'-disulfone, 4,6-diaminoresorcinol, 2,2'-diaminodiphenyl sulfide, 4,4'-diaminodiphenyl sulfide, 4,4'-diaminodiphenyl methane, 3,4'-diaminodiphenyl methane, 3,3'-diaminodiphenyl methane, 4,4'-diamino-3,3'-dimethyldiphenyl methane, 3,3',5,5'-teteramethylbenzidine, 3,3'-diamino-4,4'-dihydroxybiphenyl, 4,4'-diamino-1,2-diphenyl methane, n-buthylene glycol-di-4-aminophenylether, n-pentyl glycol-di-4-aminophenylether, 4,4'-diamino benzophenone, 3,3'-diethyl benzidine, 1,5-diamino anthraquinone, and 2-chloro-p-phenylenediamine, 4,4'-diamino-p-terphenyl. There is no limitation on the acid anhydride of polyimide resin at least one acid anhydride selected from the group consisting of pyromellitic anhydride, 4,4-oxydiphthalate anhydride, 3,3',4,4'-biphenyltetracarboxylic acid anhydride, 3,3',4,4'-benzophenonetetracarboxylic acid anhydride, 3,3',4,4'-diphenylsulfonetetracarboxylic acid anhydride, naphthalene-1,4,5,8-tetracarboxylic acid anhydride, 3,4,9,10-perylenetetracarboxylic acid anhydride, buthanetetracarboxylic acid anhydride, cyclobuthanetetracarboxylic acid anhydride, cyclopentanetetracarboxylic acid anhydride, cyclohexanetetracarboxylic acid anhydride, bicyclo(2,2,2)octo-7-en-(2,3,5,6)tetracarboxylic acid anhydride.

The polyimide resin including fluorine of the invention can be prepared with tetracarboxylic dianhydride and diamine by a conventional polymerization method. For example, tetracarboxylic dianhydride and diamine are prepared at the same mole %, and are stirred and mixed in a polar solvent at less than 80° C., more preferably 0°–60° C., thus polymerizing polyamic acid. The polar solvent (organic solvent (P)) is preferably diethylene glycol dimethylether. N-methyl-2-pyrrolidone; pyridine; N,N,-dimethyl acetamide; N,N-dimethyl formamide; dimethyl sulfoxide; tetramethyl urea; phenol; and cresol may also be applied as the polar solvent.

Among the polar solvents mentioned above, diethylene glycol dimethyl ether is most preferable since it can control the leaching speed of the polyimide resin to the solidifying solution within a preferable range. More specifically, an asymmetrical film preventing pin holes over a wide range can easily be formed when diethylene glycol dimethyl ether is applied. Diethylene glycol dimethyl ether may be applied alone, or mixed with other polar solvents.

In the polyamic acid solution, a tertiary amine compound such as trimethyl amine, triethyl amine and pyridine, an acid anhydride such as acetic anhydride, thionyl chloride, carbodiimide, or the like is added as an imide reacting agent. The solution is then mixed and stirred at 5°–150° C., thus providing a 70% or higher imide reaction ratio. Cobalt acetate and magnesium oxide may also be added to the imide reacting agent so as to increase the speed of the imide reaction. Among the imide reacting agents, pyridine and acetic anhydride is most preferably used.

During the imide reaction, the imide reacting agent need not be added, and instead the polyamic acid solution may be heated at 100°–400° C., or more preferably 120°–300° C.

Since the imide reacting agent is polymerized with the organic solvent (P) after the imide reaction, the solution after the reaction can be applied as a cast solution without removing the imide reacting agent.

The concentration of polyimide resin including fluorine is 3–40% by weight, or more preferably 10–30% by weight. The mole amount of the imide reacting agent is 0.7 times or higher, or more preferably 0.7–3 times, as much as the mole amount of tetracarboxylic dianhydride or diamine. If necessary, a swelling agent, a dispersing agent, a thickener, and the like may also be added in preparing the cast solution.

In order to adjust the solubility of the polyimide including fluorine and the final viscosity of the cast solution, an aprotic solvent such as N-methyl-2-pyrrolidone (NMP), N,N-dimethyl acetamide and N,N-dimethyl formamide may be added. The added amount of the aprotic solvent depends on the kind of solvent, but is preferably less than 40% by weight.

The wet phase transversion method of applying the cast solution mentioned above is described below. There is no particular limitation on the method of forming a gas permeation membrane or the form of the membrane. However, an asymmetrical membrane which is flat or is in a hollow yarn condition is formed by dipping the cast solution in a solidifying solution by an extrusion method or a flow cast method.

The flat asymmetrical membrane is prepared by coating the cast solution on a gas permeating supporting film by a casting or dipping method and by dipping in a solidifying solution. The mechanical strength of the membrane increases when the asymmetrical membrance is in a laminated form. The gas permeating supporting film includes an organic, inorganic or metallic porous material, woven cloth, unwoven cloth, and the like. The supporting film has a flat and smooth surface. Any material which is not dissolved or swelled by the organic solvent (P) or the solidifying solution applied in the invention can be used as the gas permeating supporting film. However, a porous film of polyimide, polyamide, polysulfone, polyolefin, or the like may be used as the supporting film.

A film is formed from the cast solution applying the organic solvent (P) of the invention at −30°–80° C., or more preferably −20°–40° C.

As the solidifying solution for removing the organic solvent (P), any solution can be applied which does not dissolve the polyimide resin including fluorine and is compatibile with the organic solvent (P). However, water, alcohol such as methanol, ethanol and isopropyl alcohol, or a mixture of water and alcohol is applicable. Among these materials, water is most preferable. There is no limitation on the temperature of the solidifying solution during the process of removing the organic solvent (P), but the temperature is preferably 0°–50° C. When the organic solvent (P) is removed, the imide reacting agent mixed in the cast solution is dissolved and removed by the solidifying solution.

DETAILED DESCRIPTION OF THE INVENTION

This invention will be described by referring to the following illustrative examples.

EXAMPLE 1

Polyimide including fluorine and having a repeating molecular unit as shown in Formula (11) was prepared by the following method.

EXAMPLE 2

The same processes as in Example 1 were carried out, except that the temperature of water (solidifying solution) was 30° C. The results are shown in Table 1.

EXAMPLE 3

The same processes as in Example 1 were carried out, except that the temperature of water (solidifying solution) was 38° C. The results are shown in Table 1.

EXAMPLE 4

The same processes as in Example 1 were carried out, except that the temperature of water (solidifying solution) and of the cast solution were 30° C. and 0° C. respectively. The results are shown in Table 1.

EXAMPLE 5

The same processes as in Example 1 were carried out, except that the temperature of water (solidifying solution) and of the cast solution were 38° C. and 0° C. respectively. The results are shown in Table 1.

EXAMPLE 6

Polyimide having a repeating molecular unit as shown in Formula 12 was dissolved by adding N-methyl-2-pyrrolidone as an organic solvent, so that 16% by weight of the polyimide was in the organic solvent.

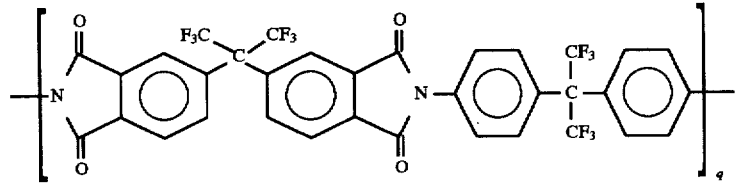

Formula (11)

wherein q is 435, which is the value calculated based on weight-average molecular weight.

5,5'-2,2,2-trifluoro-1-(trifluoromethyl)ethylidene-bis-1,3-iso-benzofurandion (6FDA) was added at 0.75 mol in a nitrogen atmosphere to a solution in which 2,2-bis(4-aminophenyl)hexafluoropropane (BAAF) was dissolved at 0.75 mol in 1842 g of diethylene glycol dimethylether, was stirred at room temperature for eight hours, and was then polymerized. Thus, polyamic acid was prepared.

Then, 406 g of diethylene glycol dimethyl ether was added. 2.25 mol of pyridine (imide reacting agent) and 2.25 mol of acetic anhydride were added to the solution and stirred at a room temperature for twelve hours, thus generating an imide reaction. After the reaction, it is unnecessary to remove the imide reacting agent from the prepared solution. The solution was filtered, and was kept still so as to eliminate bubbles. One day was required to provide the cast solution in the above-mentioned processes.

On a polyester unwoven cloth, the cast solution at 30° C. was cast by an applicator to 100 cm width and 130 µm thickness. The cloth was then dipped in water (solidifying solution) at 25° C. for one hour. Then, the cloth was dried with warm air at 60° C., thus providing a polyimide-type gas permeation membrane including fluorine. The permeability of the gas permeation membrane was evaluated, and the results are shown in the following Table 1–3. Two days were needed to form the gas permeation membrane.

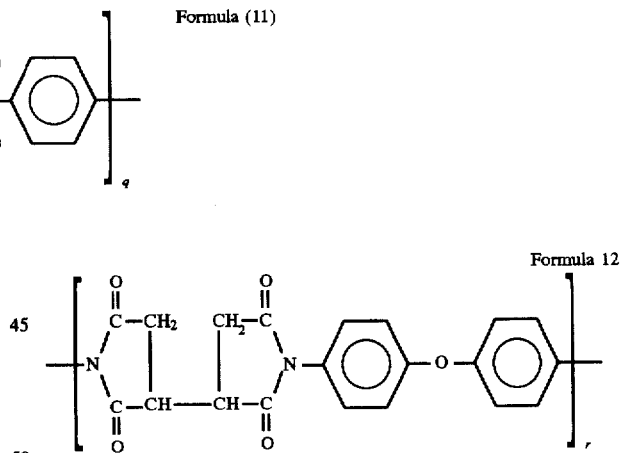

Formula 12 wherein r is 276, which is the value calculated based on weight-average molecular weight.

Then, the solution was filtered, and was kept still so as to eliminate bubbles, thus preparing a cast solution. On a polyester unwoven cloth, the cast solution was coated by an applicator. The cloth was then dipped in water (solidifying solution) at 46° C., thereby forming a 170 µm thick porous supporting film.

As in Example 1, a cast solution was prepared by dipping a solution, prepared after an imide reaction, in water. A gas permeation membrane was then formed on the porous supporting film without removing the imide reacting agent. The permeability of the gas permeation membrane was evaluated, and the results are shown in Table 1. Since the permeability of the porous supporting film became rate-determining in this example, the permeating speed of $CO_2$ in the example is low compared with other examples.

TABLE 1

| | Polyimide Resin Including Fluorine Formula Number of Weight Part | Cast Solution = Organic Solvent (P) ($\alpha^{*1}$) Organic Solvent (Wt. P) |
|---|---|---|
| Example 1 | (Chemical Formula 10) 18 Parts | DEGDME$^{*2}$ 69.5 Parts |
| Example 2 | (Chemical Formula 10) 18 Parts | DEGDME 69.5 Parts |
| Example 3 | (Chemical Formula 10) 18 Parts | DEGDME 69.5 Parts |
| Example 4 | (Chemical Formula 10) 18 Parts | DEGDME 69.5 Parts |
| Example 5 | (Chemical Formula 10) 18 Parts | DEGDME 69.5 Parts |
| Example 6 | (Chemical Formula 10) 18 Parts | DEGDME 69.5 Parts |

$\alpha^{*1}$: When an imide reacting agent is used, it is indicated as "Included" (pyridine: 5.5 wt. parts, acetic anhydride: 7.0 wt. parts).
DEGDME$^{*2}$: diethylene glycol dimethyl ether

TABLE 2

| | Cast Solution = Organic Solvent (P)($\alpha^{*1}$) Organic Solvent (P) | | Solvent (B) Solidifying Solution | | Dehydrating Treatment and Solvent |
|---|---|---|---|---|---|
| | $\alpha$ | Temp. (°C.) | (a) | (b) | Replacement |
| Example 1 | Included | 30 | water | 25 | (c) |
| Example 2 | Included | 30 | water | 30 | (c) |
| Example 3 | Included | 30 | water | 38 | (c) |
| Example 4 | Included | 30 | water | 30 | (c) |
| Example 5 | Included | 30 | water | 38 | (c) |
| Example 6 | Included | 30 | water | 25 | (c) |

(a) Solvent (B)
(b) Dipping Temperature (°C.)
(c) Dried with Warm Air at 60° C.
$\alpha^{*1}$: When an imide reacting agent is used, it is indicated as "Included" (pyridine: 5.5 parts, acetic anhydride: 7.0 parts).

TABLE 3

| | Permeability of Gas $CO_2$ Permeating Speed ($Nm^3/m^2/h/atm$) | Permeation Membrane $CO_2/CH_4$ Separation Factor |
|---|---|---|
| Example 1 | 0.79 | 15 |
| Example 2 | 2.38 | 24 |
| Example 3 | 3.40 | 24 |
| Example 4 | 2.54 | 35 |
| Example 5 | 3.17 | 22 |
| Example 6 | 0.40 | 12 |

Comparative Example 1

Polyimide including fluorine and having a repeating molecular unit as shown in Formula 10 was synthesized in a N-methyl-2-pyrrolidone solvent in the following method.

0.75 mol of 6FDA was added to a solution in which 0.75 mol of BAAF was dissolved in 1842 g of N-methyl-2-pyrrolidone in a nitrogen atmosphere, and was stirred at room temeprature for eight hours so as to carry out polymerization, thus providing polyamic acid.

Then, 406 g of N-methyl-2-pyrrolidone was added, and the solution was stirred until it became even. 2.25 mol of pyridine and 2.25 mol of acetic anhydride were added, and were stirred at room temeprature for twelve hours so as to carry out an imide reaction. After the reaction, the solution was poured into a large quantity of water, thus depositing the polymer. The polymer was washed with pure water repeately until the pyridine and acetic odor was completely eliminated. Then, the polymer was dried at 100° C. for fifteen hours in the reduced pressure of a vaccum drier.

The polymer was dissolved in diethylene glycol dimethyl ether at 18% by weight, and was then filtered. The polymer was set still until the bubbles were completely gone. As a result, a cast solution was prepared. Three days were required to prepare the cast solution even though it took only one day in Example 1.

As in Example 1, the cast solution at 30° C. was cast on a polyester unwoven cloth by an applicator to 100 cm wide and 130 μm thickness. The cloth was then dipped in water (solidifying solution) at 25° C. for one hour. Then, the cloth was dried with warm air at 60° C., thus providing a polyimide-type gas permeation membrane including fluorine. Four days were needed to form the gas permeation membrane. Compared with Example 1, more processes are required, and the quantity of solvent is large.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A dope for cast formation, comprising a fluorine containing polyimide resin and a polar organic solvent (P), the polar organic solvent comprising diethylene glycol dimethyl ether, the organic solvent (P) being present during resin polymerization of said polyimide resin, said fluorine containing polyimide resin comprising at least three fluorine atoms in a repeating molecular unit and having a repeating unit which is expressed as the following Formula 1;

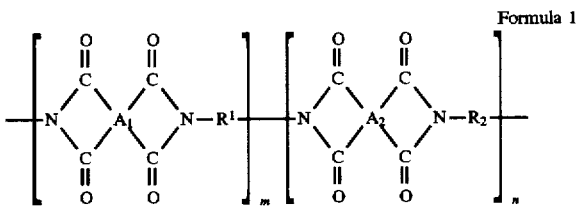

Formula 1 where $A_1$ and $A_2$ are tetravalent organic groups comprising aromatic, alicyclic, or aliphatic hydrocarbon groups; $R_1$ and $R_2$ are divalent aromatic, alicyclic, aliphatic hydrocarbon groups, or divalent organic groups in which aromatic, alicyclic or aliphatic hydrocarbon groups are bonded by divalent organic bond groups; and at least one organic group selected from the group consisting of $A_1$, $A_2$, $R_1$ and $R_2$ has at least three fluorine atoms; and $0 \leq m \leq 1$, $0 \leq n \leq 1$, and $m+n=1$.

2. The dope for cast formation of claim 1, wherein said fluorine containing polyimide resin comprises at least one —$CF_3$ group in the repeating molecular unit.

3. The dope for cast formation of claim 1, wherein said fluorine containing polyimide resin comprises a repeating molecular unit as a main component expressed as the following Formula 2;

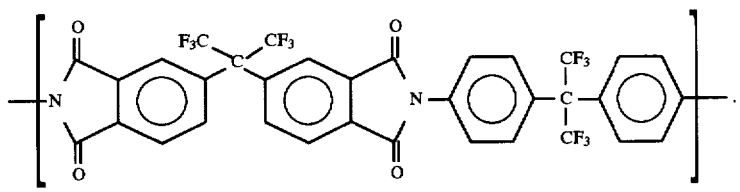 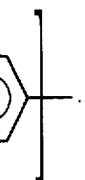

Formula 2

4. The dope for cast formation of claim 1, wherein said fluorine containing polyimide resin is present in amount of 3–40% by weight in the cast solution.

5. The dope for cast formation of claim 1, wherein said fluorine containing polyimide resin is present in amount of 10–30% by weight in the cast solution.

6. The dope for cast formation of claim 1, wherein the organic solvent (P) is diethylene glycol dimethyl ether.

7. The dope for cast formation of claim 1, wherein the organic solvent (P) comprises an imide reacting agent.

8. The dope for cast formation of claim 7, wherein the imide reacting agent comprises tertiary amine and acid anhydride.

9. The dope for cast formation of claim 7, wherein the imide reacting agent comprises pyridine and acetic anhydride.

10. The dope for cast formation of claim 7, wherein the fluorine containing resin is prepared from substantially equimolar amounts of tetracarboxylic anhydride and diamine starting materials, and the imide reacting agent is present in a mol amount three times greater than that of the tetracarboxylic anhydride or diamine.

11. The dope for cast formation of claim 1, wherein the fluorine containing polyimide resin is produced by an imide reaction, with the imide reaction rate being 70% or more.

12. A method of manufacturing a cast product from a dope, comprising the steps of:

stirring and mixing substantially equimolar amounts of tetracarboxylic anhydride including at least three fluorine atoms and diamine in a polar organic solvent (P) comprising diethylene glycol dimethyl ether to produce a solution of polyamic acid;

subjecting the solution of polyamic acid to an imide reaction at an imide reaction ratio of 70% or more to form a dope solution comprising the organic solvent (P) and a fluorine containing polyimide resin, the polyimide resin having a repeating unit which is expressed as the following Formula 1;

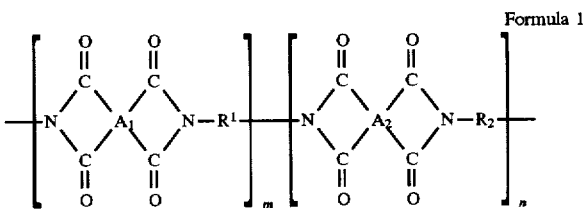

Formula 1 where $A_1$ and $A_2$ are tetravalent organic groups comprising aromatic, alicyclic, or aliphatic hydrocarbon groups; $R_1$ and $R_2$ are divalent aromatic, alicyclic, aliphatic hydrocarbon groups, or divalent organic groups in which aromatic, alicyclic or aliphatic hydrocarbon groups are bonded by divalent organic bond groups; and at least one organic group selected from the group consisting of $A_1$, $A_2$, $R_1$ $_{and}$ $_{R2}$ has at least three fluorine atoms; and $0 \leq m \leq 1$, $0 \leq n \leq 1$, and $m+n=1$;

and after the imide reaction applying the dope solution for cast formation.

13. The method of claim 12, wherein the fluorine containing polyimide resin comprises as a main component a repeating molecular unit expressed as the following Formula 2:

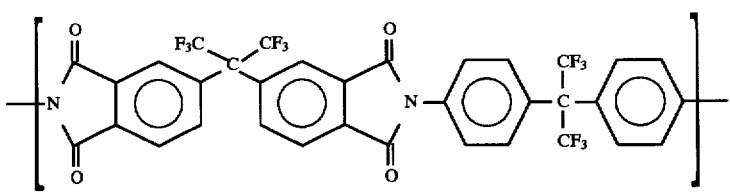

Formula 2

14. The method of claim 12, wherein the organic solvent is diethylene glycol dimethyl ether.

15. The method of claim 12, wherein the organic solvent comprises at least one polar solvent selected from the group consisting of N-methyl-2-pyrrolidone; pyridine; N,N,-dimethyl acetamide; N,N-dimethyl formamide; dimethyl sulfoxide; tetramethyl urea; phenol; and cresol.

16. The method of claim 12, wherein the fluorine containing polyimide resin comprises at least one —$CF_3$ group in the repeating molecular unit.

17. The method of claim 12, wherein the fluorine containing polyimide resin comprises at least two different kinds of polyimide resin.

18. The method of claim 12, wherein the fluorine containing polyimide resin is mixed with at least one other polymer selected from the group consisting of polyimide other than the fluorine including polyimide resin, polysulfone and polyether sulfone, wherein the total amount of the other polymer is less than 50 mole %.

19. The method of claim 18, wherein the other polymer is a copolymer or a mixed polymer.

20. The method of claim 12, wherein the imide reaction comprises addition an imide reacting agent.

21. The method of claim 20, wherein the imide reacting agent is at least one of material selected from the group consisting of tertiary amine, pyridine, acid anhydride, thionyl chloride, carbodiimide.

22. The method of claim 21, wherein the imide reacting agent is pyridine and acetic anhydride.

23. The method of claim 20, wherein the imide reaction is carried out at a temperature of from 5° C. to 150° C.

24. The method of claim 12, wherein the imide reaction is carried out by heating the polyamic acid solution at a temperature of from 100° C. to 400° C., in the absence of an imide reacting agent.

25. The method of claim 12, further comprising adding an aprotic solvent to the dope solution in an amount of less than 40% by weight to adjust the solubility of the fluorine including imide resin and the final viscosity of the dope solution.

26. The method of claim 12, wherein the cast product is an asymmetric membrane comprising a polyimide film on a porous support.

27. The method of claim 26, wherein the asymmetric membrane is formed by a wet phase transversion method.

* * * * *